United States Patent
Ellenbogen et al.

(10) Patent No.: US 12,326,620 B2
(45) Date of Patent: Jun. 10, 2025

(54) METHODS FOR GENERATING AND CONTROLLING TERAHERTZ RADIATION

(71) Applicant: RAMOT AT TEL-AVIV UNIVERSITY LTD., Tel Aviv (IL)

(72) Inventors: Tal Ellenbogen, Tel Aviv (IL); Guixin Li, Shenzhen (CN)

(73) Assignee: RAMOT AT TEL-AVIV UNIVERSITY LTD, Tel Aviv (IL)

(*) Notice: Subject to any disclaimer, the term of this patent is extended or adjusted under 35 U.S.C. 154(b) by 298 days.

(21) Appl. No.: 17/925,027

(22) PCT Filed: May 14, 2021

(86) PCT No.: PCT/IL2021/050564
§ 371 (c)(1),
(2) Date: Nov. 14, 2022

(87) PCT Pub. No.: WO2021/229586
PCT Pub. Date: Nov. 18, 2021

(65) Prior Publication Data
US 2023/0185116 A1 Jun. 15, 2023

Related U.S. Application Data

(60) Provisional application No. 63/024,528, filed on May 14, 2020.

(51) Int. Cl.
*G02F 1/01* (2006.01)
*H01Q 9/02* (2006.01)
*G01N 21/3581* (2014.01)

(52) U.S. Cl.
CPC .......... *G02F 1/0136* (2013.01); *H01Q 9/02* (2013.01); *G01N 21/3581* (2013.01); *G02F 2202/30* (2013.01); *G02F 2203/13* (2013.01)

(58) Field of Classification Search
CPC .......... G02F 1/0136; G02F 2202/30; G02F 2203/13; G01N 21/3581; H01Q 9/02
See application file for complete search history.

(56) References Cited

U.S. PATENT DOCUMENTS

| 9,958,707 B2 * | 5/2018 | Atwater ............ G02F 1/0121 |
| 11,888,233 B2 * | 1/2024 | Ellenbogen ....... G01N 21/3581 |
| 2013/0208332 A1 | 8/2013 | Yu et al. |

OTHER PUBLICATIONS

Interantional Search report and written opinion dated Sep. 5, 2021 for International Patent application PCT/IL2021/050564 filed May 14, 2021.
(Continued)

*Primary Examiner* — Daniel Petkovsek
(74) *Attorney, Agent, or Firm* — A.C. Entis-IP Ltd; Allan C. Entis

(57) ABSTRACT

Apparatus for generating THz (terahertz) radiation, the apparatus comprising: a substrate; a planar array of subwavelength antennas formed on the substrate having rotational symmetry, Cn, of order "n" greater than or equal to 3 and rotational symmetry cycle $2\pi/\eta$, which are excitable by near infrared (NIR)_pump radiation to radiate THz radiation having wavelengths that are substantially larger than characteristic dimensions of the subwavelength antenna; wherein the array comprises a plurality of sections each comprising plurality of subwavelength antennas exhibiting a spatial pattern different from that of an adjacent section of the plurality of sections.

12 Claims, 7 Drawing Sheets

(56) References Cited

OTHER PUBLICATIONS

Keren-Zur, Shay, et al. "Generation of spatiotemporally tailored terahertz wavepackets by nonlinear metasurfaces." Nature communications 10.1 (2019): 1-6.
Tang, Yutao, et al. "Nonlinear vectorial metasurface for optical encryption." Physical Review Applied 12.2 (2019): 024028.
Kats, Mikhail A., et al. "Giant birefringence in optical antenna arrays with widely tailorable optical anisotropy." Proceedings of the National Academy of Sciences 109.31 (2012): 12364-12368.
Chen, Shumei, et al. "Symmetry-selective third-harmonic generation from plasmonic metacrystals." Physical review letters 113.3 (2014): 033901.
Grady, Nathaniel K., et al. "Terahertz metamaterials for linear polarization conversion and anomalous refraction." Science 340. 6138 (2013): 1304-1307.
Chen, Shumei, et al. "Controlling the phase of optical nonlinearity with plasmonic metasurfaces" Nanophotonics 2018; 7(6): 1013-1024.
Krasnok, Alexander, et al. "Nonlinear metasurfaces: a paradigm shift in nonlinear optics" Material Today 2018; 21(1): 9-21.
Chang, Shengyuan, et al. "Optical Metasurfaces: Progress and Applications" Annu. Rev. Mater. Res. 2018. 48:279-302.
Nookala, Nishant, et al. "Ultrathin gradient nonlinear metasurface with a giant nonlinear response" Optica, Mar. 2016 vol. 3, No. 3: 283-288.
Lee, Yun-Han, et. al. "Recent progress in Pancharatnam-Berry phase optical elements and the applications for virtual/augmented realities" Opt. Data Process. Storage 2017; 3:79-88.
Liu, Chuanbao, et al. "Fully Controllable Pancharatnam-Berry Metasurface Array with High Conversion Efficiency and Broad Bandwidth" Scientific Reports, Oct. 2016, 6:34819 www.nature.com/scientificreports.
Supplementary European Search Report dated Jul. 25, 2023 for European Application No. 21805223.1 filed Nov. 16, 2022.
European Office Action dated Aug. 4, 2023 for European Application No. 21805223.1 filed Nov. 16, 2022.
Pertsch Thomas et al., Diffractive optical elements made from photonic metamaterials, Proceedings of SPIE, IEEE, US, vol. 9626, Sep. 23, 2015 (Sep. 23, 2015), pp. 962604-1-962604-16.

* cited by examiner

METHODS FOR GENERATING AND CONTROLLING TERAHERTZ RADIATION

RELATED APPLICATIONS

The present application is a U.S. National Phase of PCT/IL2021/050564 filed on May 14, 2021, which claims the benefit under 35 U.S.C. 119 (e) of U.S. Provisional Application 63/024,528, filed on May 14, 2020, the disclosures of which are incorporated herein by reference.

FIELD

Embodiments of the disclosure relate to methods of generating and controlling terahertz radiation. The work leading to this invention has received ERC Grant funding: Starting Grant (StG), PE7, under grant agreement No. ERC-2016-STG.

BACKGROUND

Terahertz (THz) radiation refers to electromagnetic radiation which spans a band of frequencies defined by the International Telecommunications Union (ITU) to extend from about $3 \times 10^{11}$ Hz (hertz) to about $3 \times 10^{12}$ Hz=3 THz. Conventionally the THz band of frequencies may be considered to extend from about $10^{11}$ Hz to about $10^{13}$ Hz and span a corresponding band of wavelengths from about 3,000 μm (micrometers) to about 3 μm respectively and associated photon energies from about 0.4 meV (millielectron volts) to about 41 meV.

THz radiation is non-ionizing and can penetrate a wide variety of non-conducting materials, and whereas it is relatively strongly absorbed by the atmosphere, THz radiation may advantageously be used for various imaging applications and fast wireless communications for ranges up to about 10 meters. By way of example, THz radiation may be advantageous for use in high resolution imaging, spectroscopy, and tomography of optically opaque objects and materials. Single cycle THz pulses may be used to acquire time-resolved and tomographic images of biological tissue. And THz radiation may be used to probe and manipulate low energy degrees of freedom in materials, such as rotations in molecules, vibrations in molecular crystals, hydrogen bonds, semiconductor excitons, and spin waves in magnetic materials.

However, generating and configuring THz radiation for the many various applications for which the radiation may advantageously be used is generally a complex endeavor that typically involves large and expensive equipment. As a result adoption of systems and technologies that use THz has been slowed.

SUMMARY

An aspect of an embodiment of the disclosure relates to providing nonlinear metasurfaces (NLMs) comprising an array of subwavelength antennas having rotational symmetry, Cn, which may be illuminated by linearly or circularly polarized radiation to generate and control the spatial and temporal shape of THz radiation. Optionally the subwavelength antenna in an array in accordance with an embodiment may all be oriented in a same direction. In an embodiment, the subwavelength antenna in an array may comprise subwavelength antenna oriented in different directions. Optionally subwavelength antenna in the array may exhibit gradual change in direction as a function of position in the array. Optionally antenna in the array may exhibit discontinuous change in direction as a function of location the array. The subwavelength antennas may be excitable by relatively low energy femtosecond pulses of, optionally near infrared (NIR), linearly or circularly polarized pump radiation to generate and radiate THz radiation having desired temporal and spatial configurations at wavelengths that are very large compared to a characteristic size of the subwavelength antennas.

In an embodiment of the disclosure, the array of subwavelength antennas is configured to generate and radiate THz radiation for which linear polarization of the THz radiation may be controlled by controlling direction of polarization of the NIR pump radiation exciting the array relative to a convenient reference axis of the antenna geometries. Optionally, the array comprises rows and columns of Cn subwavelength antennas, all of which are oriented in a same direction. In an embodiment the reference axis of a subwavelength antenna Cn defines and determines an azimuthal angle of rotation of the antenna geometry relative to a reference coordinate axis that is perpendicular to an axis of rotation of the antenna about which the antenna exhibits its characteristic Cn symmetry. Reference to an orientation of a subwavelength antenna refers to an orientation of the antenna's reference axis. A reference axis of a subwavelength antenna may coincide with an axis of reflectional symmetry of the antenna.

In an embodiment the NLM array of Cn subwavelength antennas is configured to generate and radiate in response to excitation by pump radiation, THz radiation comprising right and left circularly polarized THz radiation that respectively propagate away from the NLM in opposite angular directions. The Cn subwavelength antennas in the array, also referred to as a rotation array, may be configured to exhibit, optionally continuous, angular change in their orientation with displacement along a straight or curved spatial modulation directrix associated with the array. The change optionally integrates to at least one angle of symmetry, that is $2\pi/\eta$ radians, of the Cn antenna.

A pattern of change in spatial position and/or orientation of subwavelength antennas in an array in accordance with an embodiment of the disclosure that is repeated may be referred to as a spatial modulation cycle, or simply a modulation cycle, of the antenna or array. A distance along the directrix over which the pattern repeats itself may be referred to as a spatial period, or simply a period, of the array. A modulation cycle of an array in accordance with an embodiment that comprises a pattern of change in rotational orientation of the subwavelength antennas may be referred to as a rotation cycle of the array of subwavelength antennas. A pattern of change in angular orientation in accordance with an embodiment for which the Cn subwavelength antennas rotate through $2\pi/\eta$ radians, whether repeated or not, may be referred to as a rotational symmetry cycle of the antenna.

An NLM array, optionally referred to as a compound NLM array, in accordance with an embodiment may comprise sections, optionally referred to as subarrays, that exhibit different patterns of orientation of Cn antenna that they respectively comprise. Optionally, the array comprises two rotation subarrays. Optionally, the Cn subwavelength antennas in each rotation subarray exhibit change of rotational orientation through at least one rotation cycle of $2\pi/\eta$ radians of the subwavelength antenna. In an embodiment the two subarrays are rotated relative to each other by 180°. Optionally, the two rotation subarrays are separated by an intermediate subarray in which all the Cn subwavelength antenna in a first portion of the intermediate subarray are oriented in a first direction and all the subwavelength antennas in a second portion of the intermediate subarray are oriented in a second direction. Optionally the first and second directions are parallel and point in opposite directions. Illumination of the NLM array with a linearly polarized NIR pump pulse excites the array to transmit multicycle pulses of THz radiation that propagate away from the NLM in opposite angular directions. The THz radiation pulse that propagates in each angular direction comprises regions of right and left circular polarized light separated by a region of linearly polarized light In an embodiment an NLM array comprise Cn rotationally symmetric subwavelength antennas that exhibit surface plasmon resonances (SPR) when illuminated by NIR pump radiation. Optionally, C3 antennas are symmetric "Y" shaped antennas in which each of the arms of the antenna has a substantially same length, width and thickness, and each arm is separated from each of the other arms of the antenna by a rotational displacement of substantially $2\pi/3$ radians. In an embodiment an NLM array comprises subwavelength antenna that exhibit only C1 symmetry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
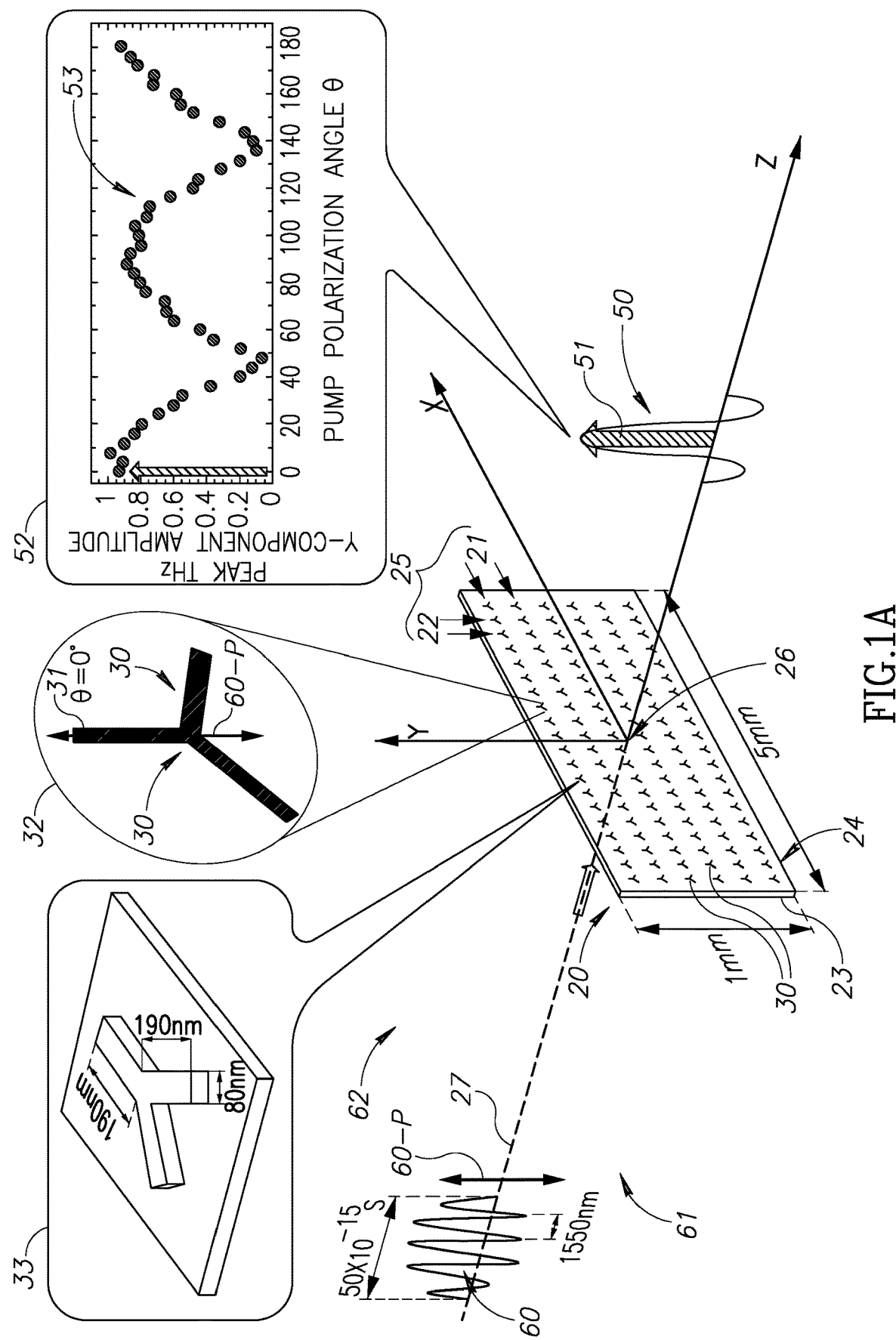
FIG. 1A-FIG. 1C schematically show an NLM comprising Cn symmetric subwavelength antenna having a same direction of orientation being excited to generate THz radiation by NIR pump pulses having different respective directions of polarization relative to a direction of orientation of the subwavelength antennas, in accordance with an embodiment of the disclosure.
Figure 1B:
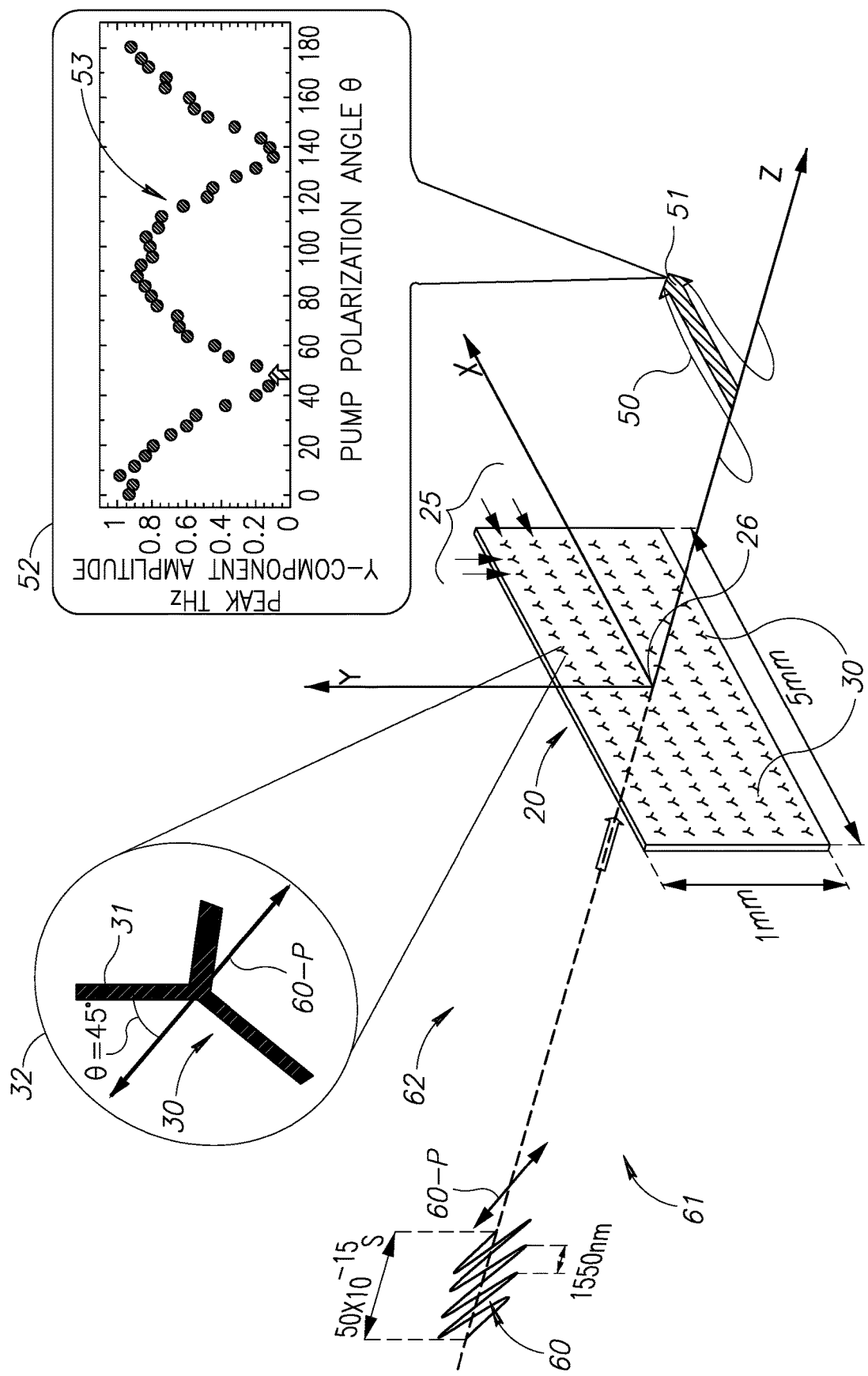
Figure 1C:
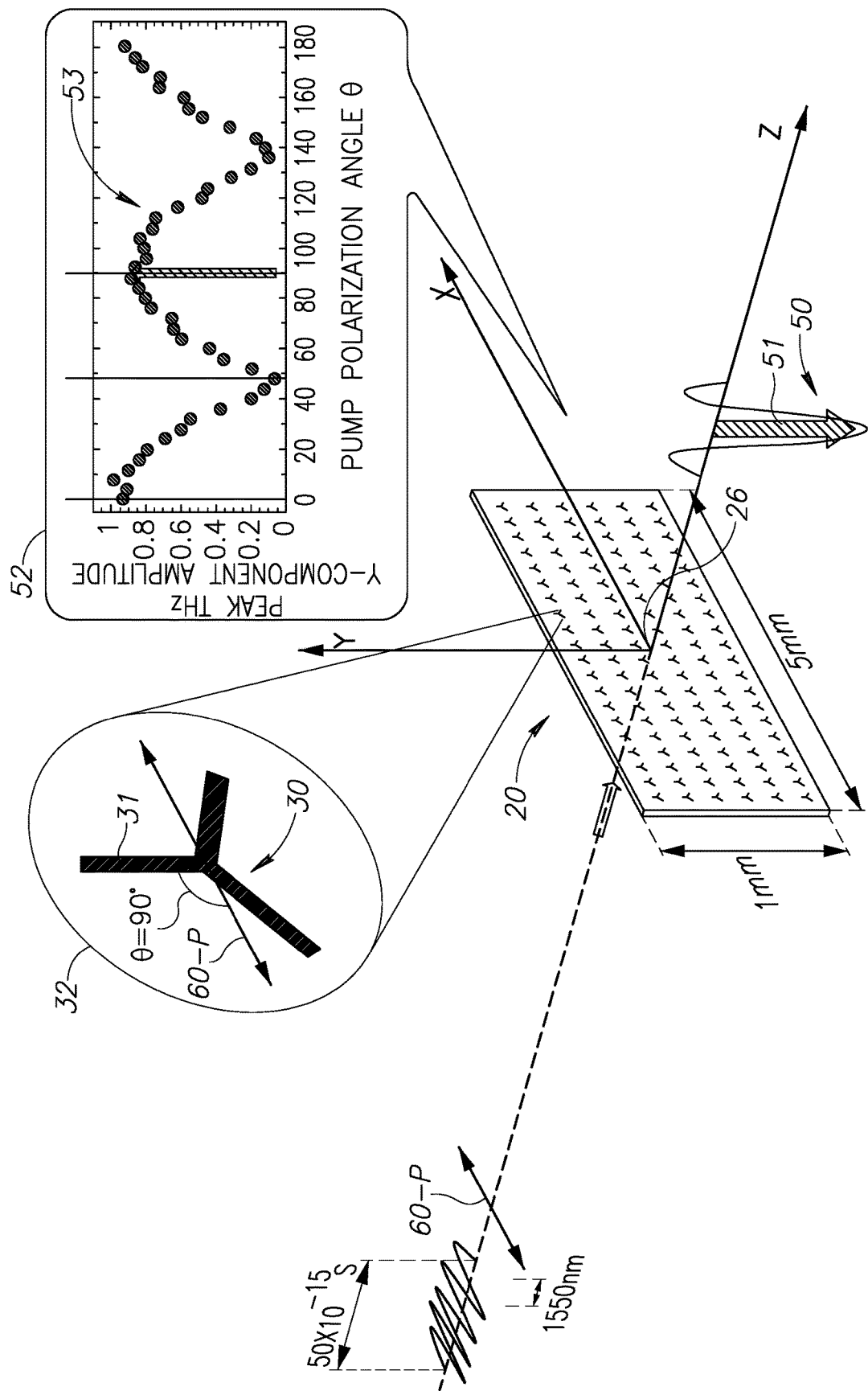

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins FIG. 1A-FIG. 1C schematically show an NLM 20 optionally comprising an array 25 of parallel rows 21 and parallel columns 22 of C3 subwavelength antennas, optionally Y-shaped metal and/or dielectric nanoantennas (Y-NANTs) 30, formed on a surface 23 of a substrate 24. NLM 20 is shown generating a substantially single cycle pulse 50 of THz radiation responsive to illumination by an, optionally NIR, pump pulse 60 of linearly polarized NIR radiation, in accordance with an embodiment of the disclosure.

Features of NLM 20 and radiation interacting with the NLM are referenced for convenience of presentation with respect to a Cartesian coordinate system 26. Surface 23 of substrate 24 on which Y-NANTs 30 are formed may be referred to as a face of NLM 20 and is assumed to be located at z=0 and lie on the x-y plane of coordinate system 26. An optic axis of NLM 20 indicated by a dashed line 27 is coincident with the z-axis. Rows 21 and columns 22 of Y-NANTs 30 are respectively parallel to the x and y-axes of coordinate system 26. Each of Y-NANTs 30 in array 25 have one of their arms parallel to the y-axis. The arm parallel to the y-axis is optionally selected as a reference axis 31 of the Y-NANT. An inset 32 schematically shows an enlarged image of a Y-NANT 30 and the Y-NANT's reference axis 31. For convenience of presentation a direction along which reference axis 31 of a Y-NANT 30 points may be referred to as a direction of the Y-NANT. A direction of polarization of NIR pump pulse 60 is indicated by a double headed arrow 60-P adjacent the NIR pump pulse, and in inset 32, relative to reference axis 31 of Y-NANT 30 shown in the inset.

FIG. 1A schematically shows NLM 20 generating THz radiation 50 responsive to illumination with NIR pump pulse 60 polarized along the y-axis and an angle θ, optionally referred to as a "pump polarization angle", between polarization direction 60-P of the pump pulse and Y-NANT reference axis 31 equal to zero. FIG. 1B and FIG. 1C schematically show NLM 20 transmitting THz radiation 50 in response to illumination by NIR pump pulse 60 at "pump polarization" angles θ, equal to 45°, and 90° respectively. Dependence of the transmitted THz pulse on angle θ is discussed below.

In an experimental example of an embodiment of NLM 20, substrate 24 comprised a layer of indium tin-oxide layer (not shown) formed on a 1 mm×5 mm rectangular glass plate, and Y-NANTs 30 were patterned from gold on the indium tin-oxide layer by nanofabrication lithography. Each Y-NANT 30, as schematically shown in an inset 33, comprised three arms having a same length equal to about 190 nm (nanometers) and width equal to about 80 nm. Each arm was separated from each of the other arms by an angular displacement of about 120°. Y-NANTs 30 along a row 21 and along a column 22 were spaced one from the other by about a same distance equal to about 550 nm. Each of Y-NANTs 30 was oriented, in a same "y-axis direction".

In an experiment to generate THz radiation 50 NIR pump pulse 60 was directed along optic axis 27 to illuminate face 23 of NLM 20 on which Y-NANTs 30 were formed. NIR pump pulse 60 was a 50 femtosecond ($10^{-15}$s), 10 µJ (microjoule) pulse having a central frequency equal to about $1.94 \times 10^{14}$ Hz, and a corresponding central wavelength of about 1550 nm. The central wavelength is about 5 times larger than the dimension of about 300 nm characterizing Y-NANTs 30.

It is noted that right circularly polarized (RCP) or left circularly polarized (LCP) radiation incident on a Cn subwavelength antenna such as C3 Y-NANTs 30 does not by itself contribute to generation of THz radiation. However, simultaneous illumination of the antenna by RCP and LCP radiation, and therefore by linearly polarized radiation, such as NIR radiation in NIR pump pulse 60 does excite nonlinear polarization currents in the antenna that generate and transmit THz radiation.

For example, considering second order optical rectification let first and second components at frequencies $\omega_1$ and $\omega_2$ of the electric field E of NIR pump pulse 60 incident on array 25 of NMR 20 be represented by $E_1(\omega_1)$ and $E_2(\omega_2)$, where bold script indicates a vector quantity. Second order time dependent polarization, $P(\Delta\omega)$, generated in a subwavelength antenna Y-NANT 30 at a THz difference frequency $\Delta\Omega = 1^{-\omega 2}$ responsive to interaction between the incident components and the Y-NANT antenna may be written, $$P(\Delta\omega) = \varepsilon_o \chi^{(2)} E_1(\omega_1) E^*_2(\omega_2), \quad (1)$$

where $\chi^{(2)}$ represents the second order tensor susceptibility of the Y-NANT antennas 30, and $\varepsilon_o$ is the permittivity of free space. For a C3 Y-NANT antenna 30, assuming that NIR pump pulse 60 is polarized parallel to reference axis 31 and the y-axis as shown in FIG. 1A, the tensor susceptibility $\chi^{(2)}$ may be written, $$\chi^{(2)} = yyy = -yxx = -xxy = -xyx. \quad (2)$$

If NIR pump pulse 60 components $E_1(\omega_1)$ and $E_2(\omega_2)$ are circularly polarized pulses, they may be written, $$E_1(\omega_1) = E_x e^{i(kz-\omega_1 t)} + E_y e^{i(kz-\omega_1 t + \sigma_1 \pi/2)} = E_x e^{i(kz-\omega_1 t)} + \sigma_1 i E_y e^{i(kz-\omega_1)}_t = E_x(\omega_1) + E_y(\sigma_1,\omega_1) = E_1(\sigma_1,\omega_1) \quad (3)$$

$$E_2(\omega_2) = E_x e^{i(kz-\omega_2 t)} + E_y e^{i(kz-\omega_2 t + \sigma_2 \pi/2)} = E_x e^{i(kz-\omega_2 t)} + \sigma_2 i E_y e^{u(kz-\omega_2)}_t = E_x(\omega_2) + E_y(\sigma_2,\omega_2) = E_2(\sigma_2,\omega_2) \quad (4)$$

where subscripts x and y indicate vector components parallel to the x and y axes respectively and a takes on a value of plus 1 for LCP radiation and a value of −1 for RCP radiation.

Substituting the expressions for $\chi^{(2)}$, $E_1(\sigma_1, \omega_1)$, and $E_2(\sigma_2, \omega_2)$ from expressions (2), (3), and (4) into equation (1) provides $$P(\Delta\omega) = P_x(\Delta\omega) + P_y(\Delta\omega) = \varepsilon_O \chi(2) E_1(\sigma_1, \omega_1) E*2(\sigma_2, \omega_2), \text{ where}$$
$$P_x(\Delta\omega) = \varepsilon_O \chi(2)[E_y(\sigma_1, \omega_1) E_x*(\omega_2) + E_x(\omega_1) E_y*(\sigma_2, \omega_2)], \text{ and}$$
$$P_y(\Delta\omega) = \varepsilon_O \chi(2)[E_x(\omega_1) E_x*(\omega_2) - E_y(\sigma_1, \omega_1) E_y*(\sigma_2, \omega_2)] \quad (5)$$

If in equations (5) $\sigma_1 = \sigma_2$, then $P_x(\Delta\omega) = P_y(\Delta\omega) = 0$, and NLM 20 does not radiate THz radiation at THz difference frequency $\Delta\omega$ based on a second order nonlinear interaction between the E field of NIR pump pulse 60 and subwavelength antennas Y-NANT 30. On the other hand, if $\sigma_2 = -\sigma_1$, that is, one of $E_1(\sigma_1, \omega_1)$ or $E_2(\sigma_2, \omega_2)$ is LCP and the other RCP radiation, and as shown in FIG. 1A the pump polarization angle $\theta = 0$, then $E_1(\sigma_1, \omega_1)$ and $E_2(\sigma_2, \omega_2)$ generate non-zero time dependent polarization components in the Y-NANT 30 antennas comprised in array 25 of NLM 20, $$P_x(\Delta\omega) = i2\varepsilon_O\chi(2)[|E_1(\sigma_1,\omega_1)||E_2(-\sigma_1,\omega_2)|]e^{-i\Delta\omega t} \text{ and}$$
$$P_y(\Delta\omega) = 2\varepsilon_O\chi(2)[|E_1(\sigma_1,\omega_1)||E_2(-\sigma_1,\omega_2)|]e^{-i\Delta\omega t}, \quad (6)$$

where the time dependence on $\Delta\omega = (\omega_1 \omega_2)$ is explicitly shown and $|E_1(\sigma_1, \omega_1)|$ and $|E_2(-\sigma_1, \omega_2)|$ are the amplitudes respectively of $E_1(\sigma_1, \omega_1)$ and $E_2(\sigma_2, \omega_2)$ defined in expressions (3) and (4).

The time dependent polarization $P_x(\Delta\omega)$ and $P_y(\Delta\omega)$ give rise to polarization currents that generate a circularly polarized THz radiation pulse. The THz pulse is an LCP pulse if $\sigma_1 = +1$ and $\sigma_2 = -1$. If the polarizations of $E_1(\sigma_1, \omega_1)$ and $E_2(\sigma_2, \omega_2)$ are reversed, that is $\sigma_1 = -1$ and $\sigma_2 = -1$ the generated THz pulse of radiation is a RCP pulse. Since NIR pump pulse 60 is linearly polarized, pump pulse 60 comprises both LCP and RCP NIR components at both frequencies $\omega_1$ and $\omega_2$ and generates in addition to the LCP THz pulse generated for $\sigma_1 = +1$ and $\sigma_2 = -1$ but also an RCP THz pulse for $\sigma_1 = -1$ and $\sigma_{2=+1}$. The LCP THz pulse and the RCP THz pulse superimpose to generate single cycle THz pulse 50 in a far field of NLM 20. THz pulse 50 is polarized along the y-axis, and has a peak amplitude schematically represented by a shaded block arrow 51, and a THz frequency component at AU).

The above discussion and equation (6) are limited to the assumption that NIR pump radiation 60 is linearly polarized along the y-axis, parallel to the reference axis 31 of Y-NANT subwavelength antennas 30, and that thereby pump polarization angle $\theta$ is equal to zero. However, $\chi^{(2)}$ and therefore $P(\Delta\omega)$ are dependent on the pump polarization angle $\theta$ and changes in $\theta$ generate changes in $\chi^{(2)}$ and $P(\Delta\omega)$. For example, for a given pump polarization angle $\theta$ that polarization direction 60-P of NIR pump pulse 60 makes with the direction of Y-NANTs 30 along the y-axis, and remembering that $\sigma_2 = \sigma_1$, $E_1(\omega_1)$ and $E_2(\omega_2, \omega_2)$, become $$E_1(\sigma_1, \omega_1) \rightarrow E_1(\sigma_1, \omega_1) e^{i\sigma_1\theta} \text{ and } E_2(\sigma_2,\omega_2) \rightarrow E_2(-\sigma_1, \omega_2) e^{-i\sigma_1\theta}, \quad (7)$$

and, explicitly showing dependence of $\chi^{(2)}$ and $P(\Delta\omega)$ on pump polarization angle $\theta$, equation (1) becomes, $$P(\Delta\omega, \theta) = \varepsilon_o \chi(\theta)^{(2)} E_1(\sigma_1, \omega_1) E^*_2(-\sigma_1, \omega_1) = \varepsilon_o \alpha(\theta)^{(2)} E_1(\sigma_1,\omega_1) E^*_2(-\sigma_1,\omega_1) e^{i3\sigma_1\theta}. \quad (8)$$

where $\chi(\theta)^{(2)} = \alpha(\theta)^{(2)} e^{i3\sigma_1\theta}$.

For $\sigma_1 = +1$ and $\sigma_2 = -1 P(\Delta\omega, \theta)$ has a geometric phase factor $e^{j3e}$ and generates an LCP THz pulse. For $\sigma_1 = -1$ and $\sigma_2 = +1$, $P(\Delta\omega, \theta)$ has a geometric phase factor $e^{-i3\theta}$ and generates an RCP THz pulse. The LCP and RCP THz pulses superimpose to generate a THz pulse linearly polarized at an angle $\theta$.

From equation (8) it is seen that $P(\Delta\omega, \theta)$ exhibits change in geometric phase as a function of $\theta$ having an angular period of 120° and from considerations of symmetry, change in peak amplitude as a function of 0 having an angular period of 90°. An inset 52 in FIG. 1A, and in FIG. 1B and FIG. 1C shows a graph 53 of an experimentally determined dependence of peak amplitude 51 on pump polarization angle θ. As schematically shown in the figures and in inset 52 of the figures, change in peak amplitude 51 has an angular period of 90°, maxima for θ=0 (FIG. 1A) and θ=90° (FIG. 1C), and a minimum at θ=45°.(FIG. 1B).

Figure 2:
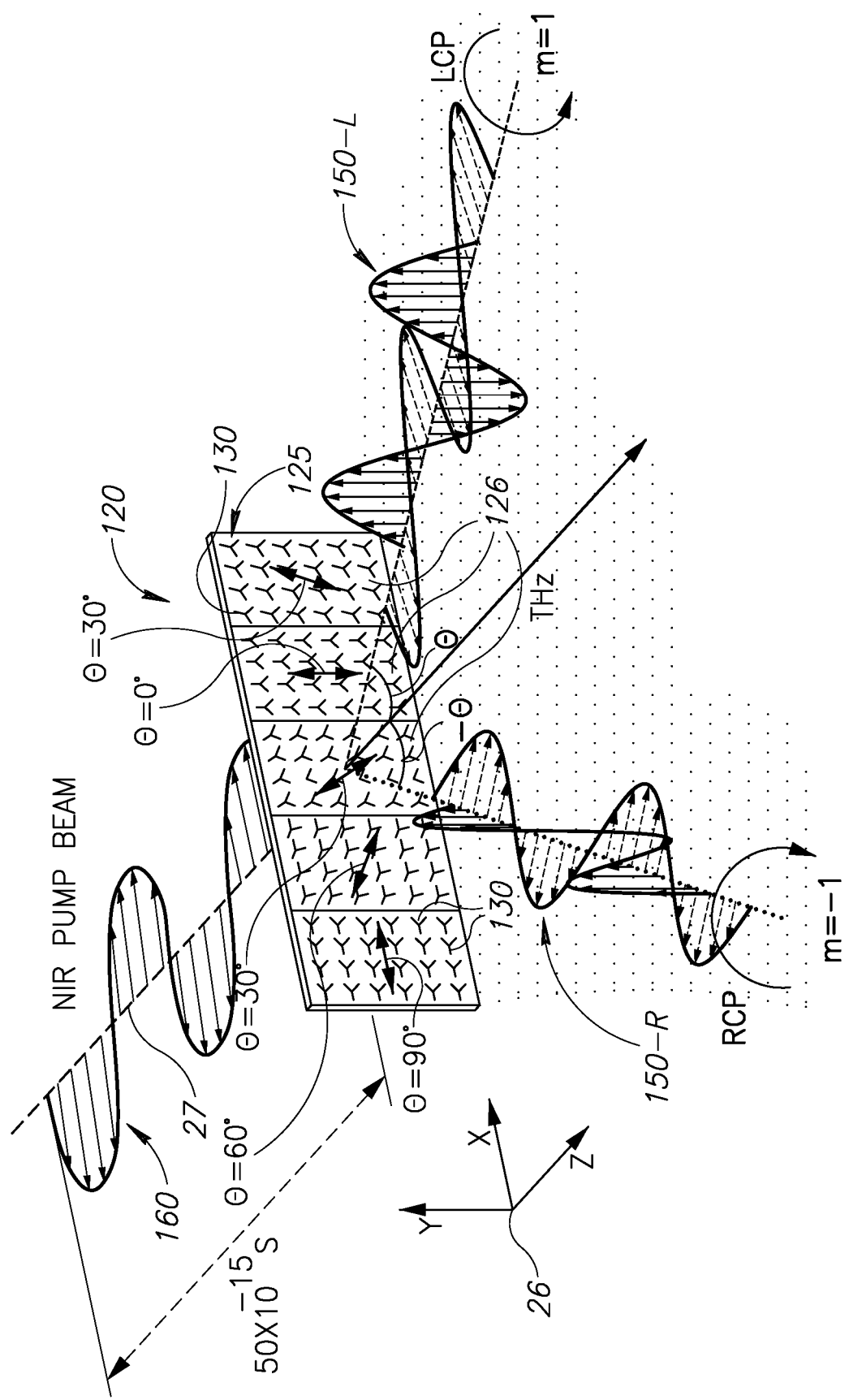
FIG. 2 schematically shows a rotation NLM comprising C3 symmetric subwavelength antennas that are configured to exhibit at least one rotational symmetry cycle, in accordance with an embodiment of the disclosure.

FIG. 2 schematically shows a rotation NLM 120 comprising a rotation array 125 of C3 symmetric, optionally Y-NANT, subwavelength antennas 130 that are configured to exhibit at least one rotational symmetry cycle through an angle $2\pi/3=120°$ along a directrix coincident with the x-axis, in accordance with an embodiment of the disclosure. Optionally, as schematically shown in FIG. 2, array 125 comprises five sections 126 each comprising Y-NANT antennas 130 having a same angular direction and for which, from section to an adjacent section, the angular direction of the Y-NANT antennas 130 increases by 30°. The angular direction of Y-NANT antennas 130 in each section is indicated by a double headed arrow labeled with an angle of the angular direction relative to the y-axis of coordinate system 29.

NLM 120 is shown being illuminated by an NIR pump beam 160 linearly polarized in the x direction that excites Y-NANT subwavelength antennas 130 in rotation array 125 to generate and transmit THz radiation in accordance with an embodiment of the disclosure. In response to excitation by the incident NIR radiation, rotation array 125 of NLM 120 generates and transmits multicycle LCR and RCP THz radiation pulses 150-L and 150-R respectively that propagate away from NLM 120 along opposite angular diffraction directions. The LCR 150-L radiation propagates along an m=1 diffraction order direction while RCP 150-R radiation propagates along a mirror image m=−1 diffraction order direction. Each of pulses exhibit five cycles in E field intensity.

By way of a numerical example, an experimental example of an embodiment of NLM 120 comprised the rotational symmetry cycle, had a spatial period of about 5 mm, and comprised five 1 mm sections 126. In response to illumination by an NIR pump pulse characterized by a central frequency equal to about $2 \times 10^{14}$ Hz, and a corresponding central wavelength of about 1500 nm, experimental NLM 120 radiated a five cycle LCP pulse 150-L and a five cycle RCP pulse 150-R that propagated away from the NLM 120 atm=1 and m=−1 diffraction angles respectively. Along optic axis 27 of NLM 120, at a propagation direction of 0°, THz radiation transmitted by NLM 120 exhibited substantially linear polarization. Each of 150-L and 150-R pulses exhibited frequency components from about 2 THz to about 2.5 THz for both $E_x$ and $E_y$ components of their respective electric fields.

Figure 3:
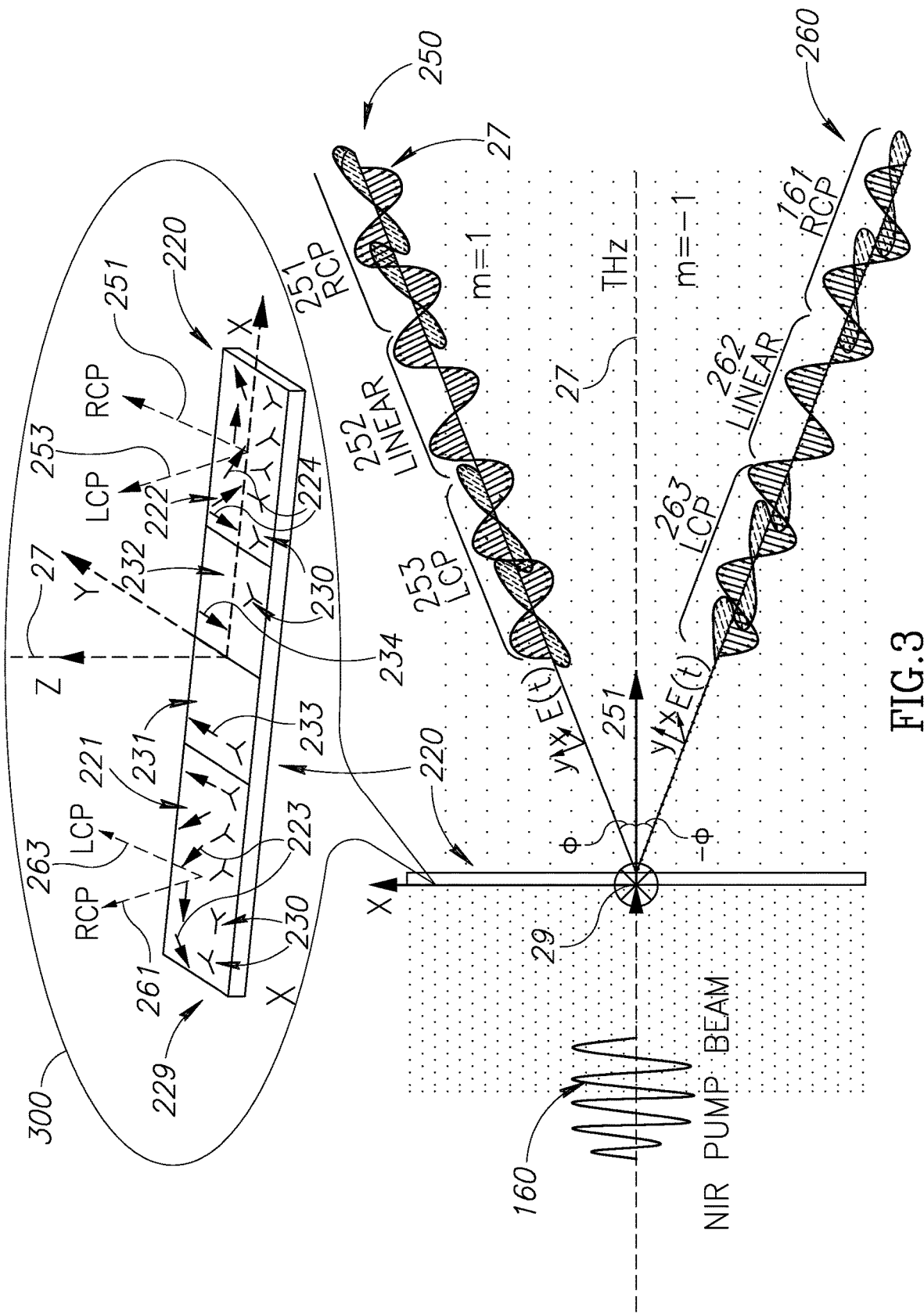
FIG. 3 schematically shows a compound NLM comprising a compound array being illuminated by a pulse of NIR radiation to generate multicycle pulses of THz radiation having different types of polarization at different locations in the THz pulse, in accordance with an embodiment of the disclosure.

FIG. 3 schematically shows a plan view of a compound NLM 220 optionally comprising an array 229 of optionally C3, Y-NANT subwavelength antennas 230, shown in a perspective view in an inset 300, in accordance with an embodiment of the disclosure. The figure shows an NIR pulse 160 linearly polarized along the x-axis illuminating compound NLM 220 to excite Y-NANT antennas 230 to generate and transmit THz radiation. Spatial features of NLM 220 and NIR pulse 160 may be referenced with respect to a coordinate system 29 having a z-axis coincident with an optic axis of NLM 220, represented by a dashed line 27.

Y-NANT subwavelength antennas in array 229 are configured by way of example, in two rotation subarrays arrays 221 and 222 separated by intermediate subarrays 231 and 232. For convenience of presentation and to moderate clutter only a few representative images of Y-NANT antenna 230 are shown in each subarray. The directions of Y-NANT antennas 230 in each rotation subarray 221 and 222 are rotated along a directrix coincident with the x-axis through a rotation symmetry cycle of $2\pi/3$ radians =120° from an initial direction parallel to the y-axis at a location closest to an adjacent intermediate subarray 231 or 232 to a direction rotated by 120° relative to the initial direction farthest from the nearest intermediate subarray. Orientation arrows 223 in subarray 221 indicate directions of Y-NANTs 230 in subarray 221 at respective locations of the orientation arrow in the subarray. Orientation arrows 224 in subarray 222 indicate direction of Y-NANTs 230 in subarray 222 at locations of the orientation arrows in subarray 222. In accordance with an embodiment of the disclosure, subarray 221 and subarray 222 are transformable one into the other by a 180° rotation about optic axis 27. Optionally, directions of all Y-NANT antennas 230 in intermediate subarray 231 are parallel to the y-axis and directions of all Y-NANT antennas 230 in intermediate subarray 232 are anti-parallel to the y-axis. Orientation arrows 233 and 234 indicate orientation of Y-NANTs in intermediate subarrays 231 and 232 respectively.

In response to illumination by NIR pulse 160, compound NLM 220 generates and transmits THz radiation comprising a THz multicycle pulse 250 propagating along an m=1 order diffraction angle φ and a THz multicycle pulse 260 propagating along an m=−1 order diffraction angle −φ. THz multicycle pulse 250 comprises a first portion 251 in which THz radiations is RCP, a second portion 252 that is linearly polarized, and a third portion 253 that is LCP. Similarly, THz multicycle pulse 260 comprises a first portion 261 in which THz radiations is RCP, a second portion 262 that is linearly polarized, and a third portion 263 that is LCP.

It is noted that both THz pulse 250 and THz pulse 260 have substantially identical RCP, linear, and LCP configurations but propagate in opposite angular diffraction directions because, in accordance with an embodiment of the disclosure, rotation subarrays 221 and 222 are rotated with respect to each other by 180°. As a result, they transmit same circularly polarized THz radiation in opposite angular diffraction directions. Whereas rotation subarray 221 transmits LCP THz radiation in the diffraction order m =1 angular direction and RCP THz radiation in the diffraction order m=−1 angular direction, rotation subarray 222 transmits LCP THz radiation in the diffraction order m=−1 angular direction and RCP THz radiation in the diffraction order m=1 angular direction. And intermediate subarrays 231 and 232 transmit LCP and RCP THz radiation that superimpose to generate linearly polarized THz radiation that propagates symmetrically with respect to optic axis 27. Subarrays 231 and 232 transmit same linear polarized THz radiation in both m=1 and m=−1 diffraction order angular directions. However, because of path length differences, in m=1 angular direction linearly polarized THz radiation from subarrays 231 and 232 is delayed relative to RCP THz radiation from subarray 221, and LCP THz radiation from subarray 222 is delayed with respect to the linear THz radiation from intermediated subarrays 233 and 234. As a result, radiation that NLM 220 radiates along the m=−1 direction comprises temporally sequential RCP, linear, and LCP THz radiation. Similarly, because of path length differences, radiation that NLM 220 radiates along the m=1 direction also comprises temporally sequential RCP, linear, and LCP THz radiation.

Figure 4:
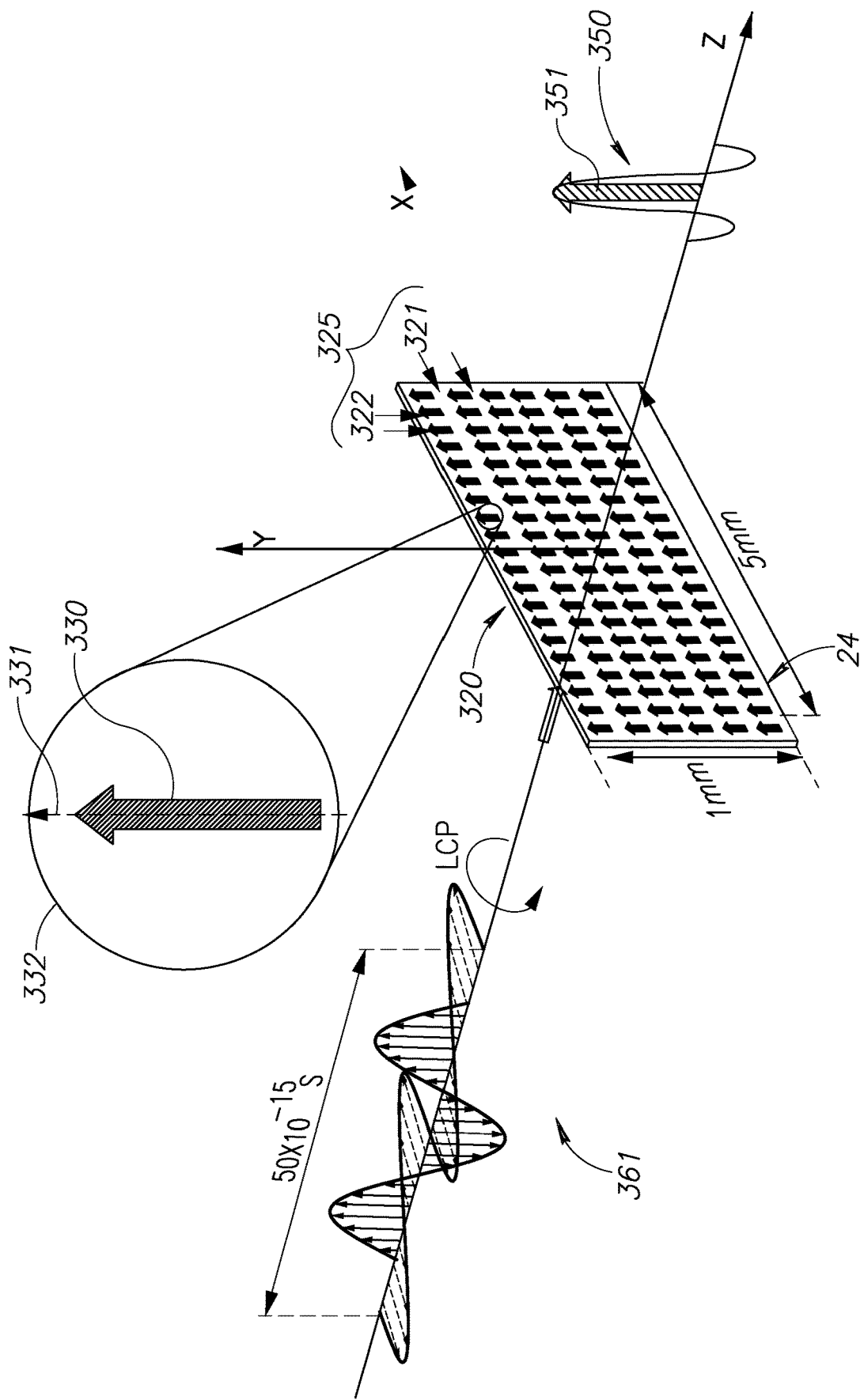
FIG. 4 schematically shows an NLM array comprising uniformly oriented C1 subwavelength antenna being illuminated by circularly polarized light to generate THz radiation that is linearly polarized along a direction determined an optic axis of the subwavelength antenna, in accordance with an embodiment of the disclosure.

Whereas NLMs in the above discussion are described as comprising nanoantennas that have C3 symmetry which are excited by linearly polarized pump pulses, embodiments of the disclosure are not limited to C3 antennas or excitation by linearly polarized pump pulses. By way of example FIG. 4 schematically shows an NLM 320 comprising a uniform array 325 of rows 321 and columns 322 of C1-NANTs, represented by arrow 330, and optionally having their orientation and a reference axis 331 parallel to the y-axis. In the figure C1-NANT antennas 330 are being excited by a circularly polarized pulse of IR light 361 to generate a linearly polarized pulse of THz radiation, in accordance with an embodiment of the disclosure.

When illuminated by a pump radiation pulse, the "C1 configuration" of C1-NANTs 330 constrains excitation of THz currents in the C1-NANTs and in near neighborhood material of the C1-NANTs substantially parallel to their respective reference axes 331. As a result, when illuminated by circularly polarized radiation, only a component of the radiation parallel to reference axis 331 excites THz currents at the surface and in near neighborhood material of the C1-NANTs. For example, at any phase of circularly polarized light 361, a component of the circularly polarized light perpendicular to reference axis 331 cannot generate substantial, if at all, THz currents. A far field THz pulse generated by excitation of C1-NANTs 330 is therefore linearly polarized substantially parallel to the reference axis. Furthermore, since, except for a phase change, circularly polarized light is invariant under rotation about its direction of propagation, THz pulses of linearly polarized light polarized in any desired direction may be generated simply by rotating NLM 320 about the z-axis to orient reference axis 331 in the desired direction. In FIG. 4 reference axis 331 is aligned with the y-axis and polarization of THz pulse 351 is also oriented along the y-axis. It is noted that whereas rotation of NLM 320 about the z-axis rotates the direction of polarization of THz pulse 351 amplitude of THz pulse is invariant under the rotation.

It is also noted that whereas C1-NANTs are represented by an icon, an arrow, that is invariant under a parity transform C1-NANTs in accordance with an embodiment of the disclosure are not limit to parity invariant C1-Nants. For example, C1-NANTs in an array such as array 325 in accordance with an embodiment of the disclosure may have an L-shape, in which, optionally, the legs of the L have different lengths. Illumination of the L-shaped C1-NANTs with circularly polarized light will generate elliptically or linearly polarized light for which a direction of the major axis is controllable by rotation of the array.

In accordance with an embodiment of the disclosure an apparatus for generating THz radiation comprises a source of circular polarized radiation directed to illuminate an NLM array of C1-NANTs and generate linearly polarized light, which NLM is rotatable to rotate a direction of the polarization of the light.

Figure 5:
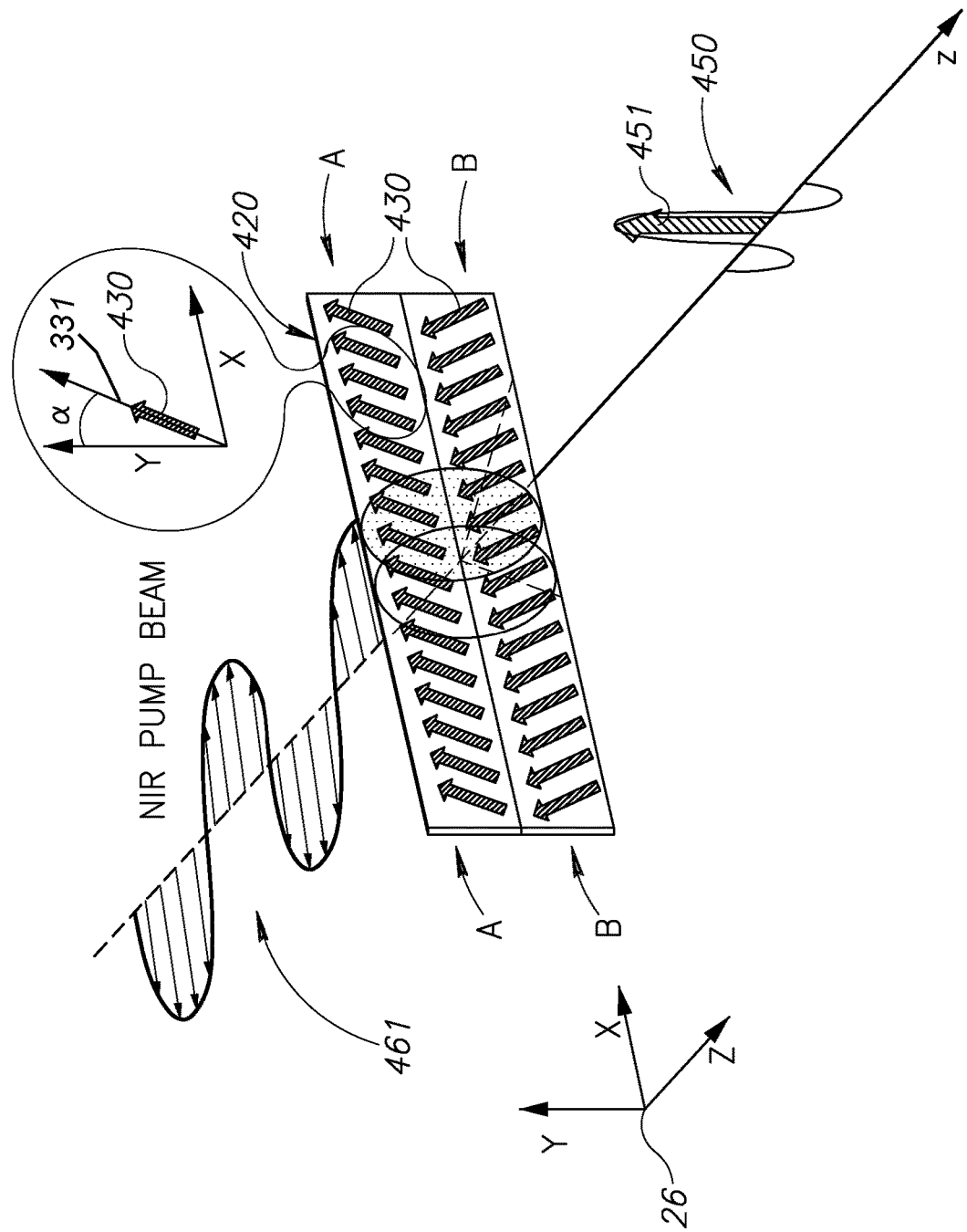
FIG. 5 schematically shows an NLM array comprising rows of same C1 subwavelength antenna in which each row comprises uniformly oriented antenna and the antenna in adjacent rows are oriented differently being illuminated by linearly polarized light to generate linearly polarized THz radiation, in accordance with an embodiment of the disclosure.

By way of another example of an NLM comprising C1-NANTs excited to generate THz radiation, FIG. 5 schematically shows an NLM 420 comprising at least one pair of rows, A and B, of C1-NANTs 430, that are illuminated by an, optionally linearly, polarized NIR pump beam 461 to generate THz radiation in accordance with an embodiment of the disclosure. C1-NANTs 430 in a same row have their respective reference axes parallel and parallel or rotated about the z-axis relative to the y-axis. C1-NANTs 430 in adjacent rows have their reference axes parallel or rotated in opposite directions relative to the y-axis in accordance with an embodiment of the disclosure. By way of example, in NLM 420, C1-NANTs 430 in row A are rotated clockwise by an angle α relative to the y-axis as schematically illustrated in an inset 432. C1-NANTs 430 in the NLM are rotated counterclockwise by angle α. In response to illumination by pump beam 461, surface plasmon currents in C1-NANTs 430 generate THz waves that constructively interfere to generate THz pulses 450 that propagate in in the far field along the z-axis. Pulse 450 has an amplitude represented by an arrow 451 that is linearly polarized parallel to the y-axis. Amplitudes 451 is proportional to cos(a).

There is therefore provided in accordance with an embodiment of the disclosure an apparatus for generating THz (terahertz) radiation, the apparatus comprising: a substrate; a planar array of subwavelength antennas formed on the substrate having rotational symmetry, Cn, of order "n" greater than or equal to 3 and rotational symmetry cycle $2\pi/n$, which are excitable by near infrared (NIR) pump radiation to radiate THz radiation having wavelengths that are substantially larger than characteristic dimensions of the subwavelength antenna; wherein the array comprises a plurality of sections each comprising a plurality of subwavelength antennas exhibiting a spatial pattern different from that of an adjacent section of the plurality of sections. Optionally, the orientation of subwavelength antennas in a same section share a same angular orientation. Optionally, a number of the plurality of sections is equal to "m", and a difference in angular orientation of the subwavelength antennas in adjacent sections is equal to $2\pi/nm$.

In an embodiment the apparatus comprises a first section characterized by a first spatial pattern for which angular orientation of the subwavelength antennas in the section exhibit a substantially continuous change in angular orientation as a function of position along a directrix of the array. Optionally, an integrated change in angular orientation of the subwavelength antennas in the first section along the directrix is equal to about a rotational symmetry cycle of the antennas.

Optionally, the apparatus comprises a second section characterized by a second spatial pattern that is transformable into the first spatial pattern by a 180° rotation about a normal to the plane of the planar array. Optionally, the first and second sections are separated by third and fourth sections for which subwavelength antennas in the third and fourth sections are characterized by third and fourth spatial patterns. Optionally, the angular orientations of subwavelength antennas in the third rotational pattern are the same and angular orientations of subwavelength antennas in the fourth rotational pattern are the same. Optionally, the third and fourth rotational patterns are transformable one in to the other by a 180° rotation about an axis perpendicular to the plane of the planar array.

In an embodiment a characteristic size of the of the Cn subwavelength antennas in the array is that of a diameter of a circle circumscribing a Cn of the Cn subwavelength antennas and the diameter is less than or equal to about 500 nm (nanometers), less than or equal to about 400 nm, or less than or equal to about 350 nm. In an embodiment the Cn antennas comprise Y shaped nanoantennas.

In an embodiment the apparatus comprises a source of NIR radiation directed to illuminate the NLM with linearly polarized NIR radiation that excites the subwavelength antennas in the array to radiate THz radiation. Optionally, the NIR radiation comprises pulses having temporal duration less than or equal to about 100 fm (femtoseconds), less than or equal to about 75 fm, or less than or equal to about 50 fm. Optionally, the pulses have a pulse energy less than or equal to about 5 mJ (millijoules), 4 mJ, or 3.5 mJ.

There is further provided in accordance with an embodiment of the disclosure a method of generating THz (terahertz) radiation, the method comprising illuminating an apparatus according to any of claims 1-11 with linearly polarized NIR radiation that excites the subwavelength antennas in the array to radiate THz radiation. Optionally, the method comprises pulses having temporal duration less than or equal to about 100 fm (femtoseconds), less than or equal to about 75 fm, or less than or equal to about 50 fm. Optionally, the pulses have a pulse energy less than or equal to about 5 mJ (millijoules), 4 mJ, or 3.5 mJ.

There is further provided in accordance with an embodiment of the disclosure apparatus for generating THz (terahertz) radiation, the apparatus comprising: a substrate; a planar array of subwavelength antennas that exhibit only C1 symmetry formed on the substrate; and a source of radiation operable to illuminate the planar array with NIR radiation to excite the antennas to generate THz radiation. Optionally, the subwavelength antenna have respective reference axes and are oriented with their respective reference axes parallel. Optionally, the NIR radiation comprises circularly polarized NIR radiation. Optionally, the THz radiation comprises linearly polarized THz radiation. In an embodiment the array comprises at least one pair of rows of subwavelength antennas and the antennas in a same row are oriented with their respective reference axes parallel. Optionally, the antennas in adjacent rows are rotated about an axis perpendicular to the array in opposite directions. Optionally, angles by which antennas in adjacent rows are rotated have a same magnitude. Optionally, the NIR radiation comprises pulses having temporal duration less than or equal to about 100 fm (femtoseconds), less than or equal to about 75 fm, or less than or equal to about 50 fm. Optionally, the pulses have a pulse energy less than or equal to about 5 mJ (millijoules), 4 mJ, or 3.5 mJ. In an embodiment the pump radiation may be NIR radiation.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims

The invention claimed is:

1. An apparatus for generating multicycle pulses of terahertz (THz) radiation, the apparatus comprising:
   a substrate;
   a nonlinear metasurface (NLM) comprising a planar array of subwavelength antennas formed on the substrate having rotational symmetry, Cn, of odd order n and rotational symmetry 2TT/n, which are excitable by pump radiation having wavelengths that are substantially larger than characteristics dimensions of the subwavelength antenna to radiate THz radiation;
   the array having a directrix and a plurality of adjacent sections, including first and second sections separated by third and fourth adjacent sections, each section comprising a plurality of subwavelength antennas, wherein:
   the subwavelength antennas in the first and second sections are characterized by first and second spatial patterns for which angular orientation of the subwavelength antennas in the first and second sections exhibit a substantially continuous change in angular orientation as a function of position along the directrix and for which the second spatial pattern is transformable into the first spatial pattern by a 180° rotation about a normal to the plane of the planar array; and
   the subwavelength antennas in the third and fourth sections respectively exhibit third and fourth spatial patterns transformable one to the other by a 180° rotation about a normal to the plane of the planar array.

2. The apparatus according to claim 1, wherein a characteristic size of the of the subwavelength antennas in the planar array is that of a diameter of a circle circumscribing a subwavelength antenna of the subwavelength antennas and the diameter is less than or equal to about 500 nm (nanometers).

3. The apparatus according to claim 1, wherein the subwavelength antennas in the planar array comprise Y shaped nanoantennas.

4. The apparatus according to claim 1, and further comprising a source of near infrared (NIR) radiation directed to illuminate the NLM with linearly polarized NIR radiation that excites the subwavelength antennas in the planar array to radiate THz radiation.

5. The apparatus according to claim 1, wherein the pump radiation comprises near infrared (NIR) pulses having temporal duration less than or equal to about 100 fm (femtoseconds).

6. The apparatus according to claim 5, wherein the NIR pulses have a pulse energy less than or equal to about 5 mJ (millijoules).

7. The apparatus according to claim 5, wherein the NIR pulses have a pulse energy less than or equal to 3.5 mJ.

8. The apparatus according to claim 1, wherein the pump radiation is near infrared (NIR) radiation.

9. The apparatus according to claim 1, wherein the pump radiation consists essentially of first and second plane waves having respective frequencies w1 and w2 for which a difference (w1-w2) is a THz frequency.

10. The apparatus according to claim 1 wherein, the multicycle THz pulses comprise a first portion in which THz radiation is right circularly polarized (RCP), a second portion that is linearly polarized, and a third portion that is left circularly polarized (LCP).

11. The apparatus according to claim 1, wherein a characteristic size of the subwavelength antennas in the planar array is that of a diameter of a circle circumscribing a subwavelength antenna of the subwavelength antennas in the planar array and the diameter is less than or equal to 350 nm.

12. The apparatus according to claim 1, wherein the pump radiation comprises near infrared (NIR) pulses having temporal duration less than or equal to about 50 fm.

* * * * *